(12) United States Patent
Nishigaki et al.

(10) Patent No.: US 8,483,938 B2
(45) Date of Patent: Jul. 9, 2013

(54) CONTROL DEVICE FOR AN ENGINE

(75) Inventors: Takahiro Nishigaki, Nagoya (JP);
Hitoki Sugimoto, Toyota (JP)

(73) Assignee: Toyota Jidosha Kabushiki Kaisha,
Toyota-shi (JP)

( * ) Notice: Subject to any disclaimer, the term of this patent is extended or adjusted under 35 U.S.C. 154(b) by 496 days.

(21) Appl. No.: 12/883,417

(22) Filed: Sep. 16, 2010

(65) Prior Publication Data

US 2011/0071748 A1   Mar. 24, 2011

(30) Foreign Application Priority Data

Sep. 18, 2009 (JP) ................. 2009-217691

(51) Int. Cl.
*F01L 1/34* (2006.01)
*F02D 13/02* (2006.01)
*F02D 28/00* (2006.01)

(52) U.S. Cl.
USPC ...................... 701/105; 123/90.15

(58) Field of Classification Search
USPC ............ 701/105, 102, 101; 123/90.11, 90.15, 123/90.17, 90.31
See application file for complete search history.

(56) References Cited

U.S. PATENT DOCUMENTS

| 6,405,697 | B2 | 6/2002 | Mikame | |
|---|---|---|---|---|
| 7,146,267 | B2 * | 12/2006 | Sawada et al. | 701/101 |
| 7,263,957 | B2 * | 9/2007 | Miyakoshi et al. | 123/90.17 |

FOREIGN PATENT DOCUMENTS

| JP | 11-044226 | A | | 2/1999 |
|---|---|---|---|---|
| JP | 2001-234768 | A | | 8/2001 |
| JP | 2001254637 | A | | 9/2001 |
| JP | 2003003869 | A | * | 1/2003 |
| JP | 2003-222034 | A | | 8/2003 |
| JP | 2005220759 | A | | 8/2005 |
| JP | 2007205296 | A | * | 8/2007 |
| JP | 2009-202662 | A | | 9/2009 |

OTHER PUBLICATIONS

Japanese Office Action dated Jun. 28, 2011; 5 pages.

* cited by examiner

*Primary Examiner* — Hieu T Vo
(74) *Attorney, Agent, or Firm* — Gifford, Krass, Sprinkle, Anderson & Citkowski, P.C.

(57) ABSTRACT

In an engine having a variable valve timing mechanism to which an intermittent operation control is applied, appropriate execution of a foreign object removal process for the variable valve timing mechanism is enabled. An engine control device (16) which can execute intermittent operation control for an engine (12) having a variable valve timing mechanism (80) comprises a judging part which judges an abnormality in the variable valve timing mechanism (80) (step S10), a foreign object removal process executing part which causes a foreign object removal process to be executed for the variable valve timing mechanism (80) when the judging part judges that there is an abnormality in the variable valve timing mechanism (80) during an engine operation (step S12), and an intermittent operation control prohibiting part which prohibits the intermittent operation control of the engine (12) during execution of the foreign object removal process of the variable valve timing mechanism (80) (step S16).

7 Claims, 7 Drawing Sheets

CONTROL DEVICE FOR AN ENGINE

RELATED APPLICATION

This application claims priority to Japanese Patent Application No. 2009-217691, filed on Sep. 18, 2009, the entire content of which is incorporated herein by reference.

TECHNICAL FIELD

The present invention relates to a control device of a hybrid vehicle, and particularly to a control device of a hybrid vehicle which intermittently starts and stops an engine.

BACKGROUND ART

Conventionally, an engine is known which comprises a variable valve timing (VVT) mechanism in which an open/close timing of a suction valve is set to be variable. Such an engine is used as a running power source of an automobile.

In the variable valve timing mechanism, an engine power and a gas exhaust capability are optimized according to the number of rotations of the engine, by setting a rotational phase angle of a cam shaft to which a cam for opening or closing the suction valve is fixed to be variable such as advancing (advance angle) or delaying (lag angle) the rotational phase angle of the cam shaft with respect to the rotational phase angle of a crankshaft. In such a variable valve timing mechanism, when hydraulic control is used for changing the phase angle of the cam shaft, in many cases, lubricant oil which is used for lubricating a piston or power transmission system in the engine is also used as the operation oil for the hydraulic control. In this case, a foreign object contained in the operation oil, such as metal powder, may be clogged in the portion which is movable by the hydraulic control, and the variable valve timing mechanism may not be normally operated.

For example, JP 2001-254637 A discloses a valve characteristic control device of an internal combustion engine in which, when it is judged that there is abnormality in the variable valve timing mechanism, the variable valve timing mechanism is forcefully driven, for a foreign object removal process.

JP 2005-220759 A discloses a lift amount variable control device of an internal combustion engine in which, when the lift amount of a suction valve is fixed at a low lift side due to failure of a variable valve mechanism, a target number of idle rotations is corrected and increased, to avoid occurrence of stalling of the engine.

When the engine having the variable valve timing mechanism as described above is equipped in a hybrid vehicle which has a motor as a separate running power source which is driven by electrical power from a battery, even during running of the vehicle, an intermittent operation control is executed in which the operation of the engine is stopped during EV running in which the vehicle is run with the motor power. If the operation of the engine is stopped in the middle of the foreign object removal process as disclosed in JP 2001-254637 A when abnormality occurs in the variable valve timing mechanism in such a hybrid vehicle, the foreign object removal process cannot be properly executed. Because of this, problems are expected in which a user who is notified by the vehicle that failure has occurred in the variable valve timing mechanism may complain, and cost for solving such occurrence of the failure may be increased.

In addition, because the above-described foreign object removal process is control involving degradation of exhaust, in particular countries, laws require that the failure judgment of the variable valve timing mechanism be established by completing the foreign object removal process within a predetermined time period (for example, 10 seconds). In such a case, if the engine is stopped in the middle of the foreign object removal process as described above, the possibility of judgment of failure of the variable valve timing mechanism is high even through the abnormality can be solved by executing, to the maximum possible extent within the predetermined time period, the foreign object removal process.

Moreover, in JP 2005-220759 A, as described above, the target number of idling rotations is corrected and increased when the variable valve mechanism is fixed, to avoid stalling of the engine. However, although such a configuration has an advantage of inhibiting passive stopping of the engine operation during idling, this configuration cannot be applied to a vehicle which executes the intermittent operation control to actively stop the engine operation, in cases not limited to the time of idling, in order to improve the fuel consumption.

SUMMARY OF THE INVENTION

An advantage of the present invention is that an engine control device is provided which enables suitable execution of a foreign object removal process for a variable valve timing mechanism, in an engine having the variable valve timing mechanism to which an intermittent operation control is applied.

According to one aspect of the present invention, there is provided an engine control device which can execute an intermittent operation control of an engine having a variable valve timing mechanism, the engine control device comprising a judging part which judges an abnormality of the variable valve timing mechanism, an abnormality recovery process executing part which executes an abnormality recovery process for the variable valve timing mechanism when the judging part judges that there is an abnormality in the variable valve timing mechanism during an engine operation, and an intermittent operation control prohibiting part which prohibits the intermittent operation control of the engine during execution of the abnormality recovery process of the variable valve timing mechanism.

According to another aspect of the present invention, it is preferable that, in the engine control device, the judging part judges that there is an abnormality in the variable valve timing mechanism when a difference between an actual phase angle of a cam shaft of the variable valve timing mechanism detected by a cam angle sensor and a target phase angle is greater than a predetermined angle.

According to another aspect of the present invention, it is preferable that, in the engine control device, the variable valve timing mechanism comprises a rotor which is connected to an end of a cam shaft to which a cam which opens and closes at least one of a suction valve and an exhaust valve of the engine is fixed, a housing which stores in its inside the rotor in a rotatable state by hydraulic control and which rotates with the rotor in synchronization with a crankshaft of the engine, and a control valve which controls supply and exhaust of operation oil in the housing to rotate the angular position of the rotor with respect to the housing to an advance angle side or a lag angle side, and the abnormality recovery process is an operation to rotate the rotor so that the angular position of the rotor with respect to the housing alternately changes in a predetermined time interval to the advance angle side or the lag angle side.

In this case, it is preferable that, during the execution of the abnormality recovery process, a hydraulic pressure of the operation oil supplied to the control valve is set higher than that during a normal operation.

According to another aspect of the present invention, it is preferable that, in the engine control device, when the judging part does not judge that the abnormality of the variable valve timing mechanism has been resolved even after the abnormality recovery process has continued for a predetermined time period, the abnormality of the variable valve timing mechanism is displayed on a display part.

According to other aspect of the present invention, it is preferable that the engine control device is equipped in a hybrid vehicle which is equipped with a motor which is driven by receiving supply of electrical power from a battery as a running power source in addition to the engine which is a running power source.

According to further other aspect of the present invention, there is provided a vehicle comprising the engine control device according to any one of the above-described aspects of the present invention.

According to the engine control device of various aspects of the present invention, in the engine having the variable valve timing mechanism, when it is judged that there is abnormality in the variable valve timing mechanism during engine operation, and the abnormality recovery process is being executed, the intermittent operation control of the engine is prohibited. Because of this, it is possible to prevent stopping of the engine in the middle of the abnormality recovery process, and to reliably execute the abnormality recovery process. As a result, it is possible to inhibit judgment of failure of the variable valve timing mechanism even when the variable valve timing mechanism can be returned to the normal operation by removing the foreign object through the abnormality recovery process.

BRIEF DESCRIPTION OF THE DRAWINGS

The present invention will be further described with reference to the accompanying drawings wherein like reference numerals refer to like elements in the several views, and wherein.

DETAILED DESCRIPTION OF THE EMBODIMENT

A preferred embodiment of the present invention will now be described in detail with reference to the accompanying drawings. In this description, the specific shape, material, numerical value, direction, etc. are provided merely as exemplary, to facilitate understanding of the present invention, and may be suitably changed according to the usage, objective, specification, etc.

In the following description, the engine control device according to the preferred embodiment of the present invention will be described exemplifying a hybrid vehicle comprising a motor which is driven by electrical power from a battery as a running power source, in addition to an engine to which the intermittent operation control is applied. However, the present invention is not limited to such a configuration, and may be applied to a vehicle such as an automobile having, as the running power source, only the engine to which the intermittent operation control is applied.

Figure 1:
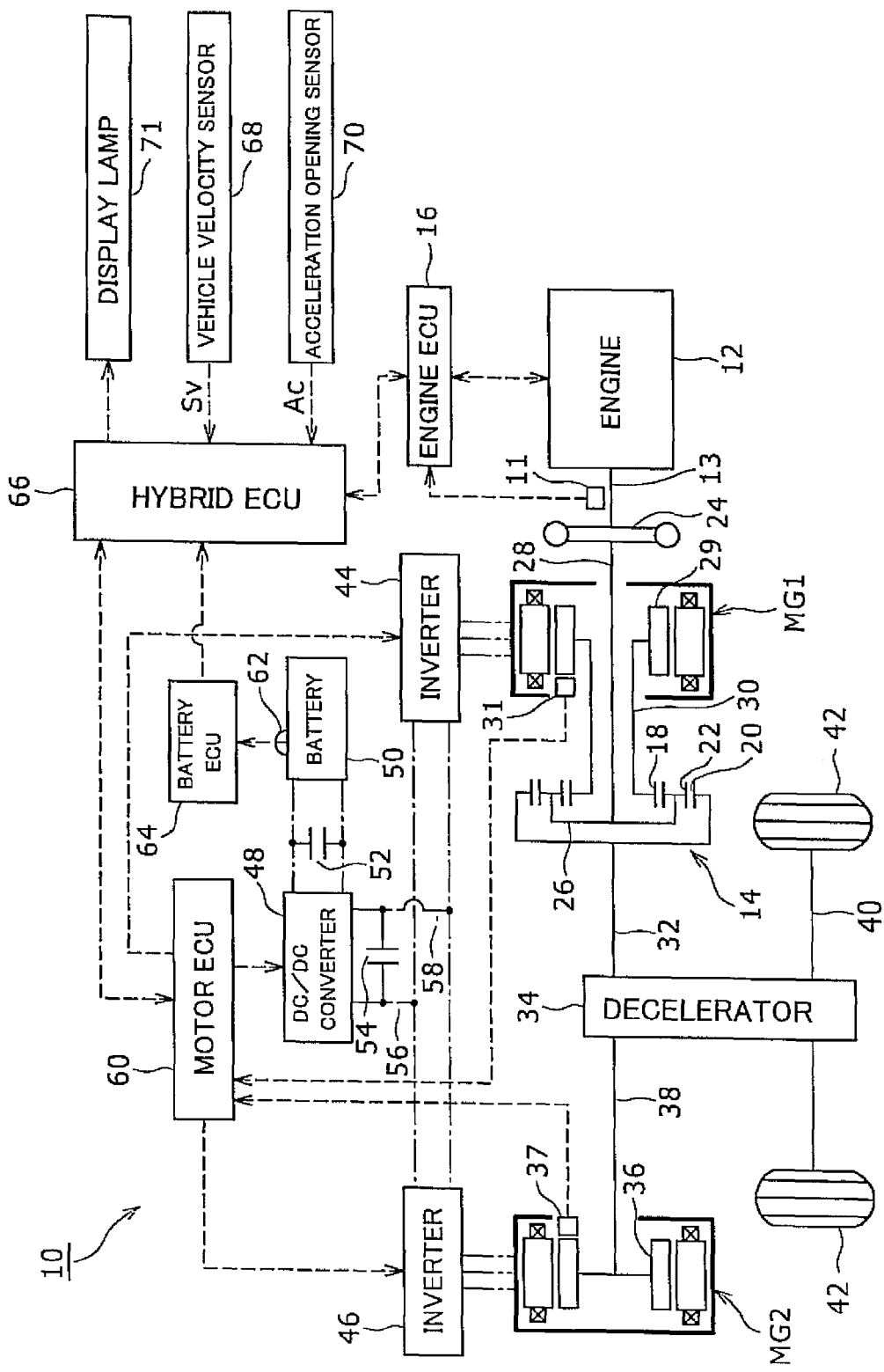
FIG. 1 is a schematic structural diagram of a hybrid vehicle to which an engine control device according to a preferred embodiment of the present invention is applied.

FIG. 1 is a diagram schematically showing a structure of a hybrid vehicle 10 including an engine control device according to a preferred embodiment of the present invention. In FIG. 1, a mechanical power transmission system is shown with a solid line, an electric power line is shown with a dot-and-chain line, and a signal line is shown with a dotted line. The hybrid vehicle 10 comprises an engine 12 which can output mechanical power for running, two three-phase alternating current synchronization motor generators (hereinafter simply referred to as "motor") MG1 and MG2, and a mechanical power distributing and integrating mechanism 14.

The engine 12 is an internal combustion engine which uses gasoline, light oil, etc. as fuel. The engine 12 is electrically connected to an ECU (Electronic Control Unit) for the engine (hereinafter simply referred to as "engine ECU") 16, and is configured such that a control signal is received from the engine ECU 16 to adjust the fuel injection, ignition, amount of intake air, timing of the suction valve, etc., and operations or actions, including start and stop, are controlled. A crank angle sensor 11 which detects a rotational angle θcr of the crankshaft is placed close to a power shaft 13 connected to the crankshaft of the engine 12. A detection result of the crank angle sensor 11 is input to the engine ECU 16, for use in calculation and monitoring of the rotational speed Ne of the engine, change of timing of the suction valve by the variable valve timing mechanism, etc. The variable valve timing mechanism included in the engine 12 will be described later in detail. The engine ECU 16 corresponds to the engine control device in the present invention.

The mechanical power distributing and integrating mechanism 14 comprises a planetary gear mechanism having a sun gear 18 placed at a center portion, a ring gear 20 placed concentrically with the sun gear 18 and having an internal tooth at an internal periphery of a ring, and a plurality of planetary gears 22 which engage both the sun gear 18 and the ring gear 20. The plurality of planetary gears 22 are attached to the end of a carrier 26 in a rotatable manner.

In the mechanical power distributing and integrating mechanism 14, the power shaft 13 of the engine 12 is connected to the carrier 26 via a damper 24 for reducing torque impact, a rotational shaft 30 connected to the rotor 29 of the motor MG1 is connected to the sun gear 18, and a decelerator or reduction gear unit 34 is connected to the ring gear 20 via a ring gear shaft 32. With this structure, in the mechanical power distributing and integrating mechanism 14, when the motor MG1 functions as a power generator, the mechanical power from the engine 12 which is input from the carrier 26 is distributed to the side of the sun gear 18 and the side of the ring gear 20 according to the gear ratio, and when the motor MG1 functions as a motor, the mechanical power from the engine 12 which is input from the carrier 26 and the mechanical power from the motor MG1 which is input from the sun gear 18 are integrated, and the integrated mechanical power is input from the ring gear 20 via the ring gear shaft 32 to the decelerator 34 having a gear array having a predetermined deceleration ratio.

A rotational shaft 38 connected to a rotor 36 of the motor MG2 is also connected to the decelerator 34, and when the motor MG2 functions as a motor, mechanical power from the motor MG2 is input to the decelerator 34.

The mechanical power which is input from at least one of the ring gear shaft 32 and the rotational shaft 38 of the motor MG2 is transmitted to a car shaft 40 via the decelerator 34, causing a wheel 42 to be rotationally driven. When, on the other hand, the mechanical power is input from the wheel 42 and the car shaft 40 to the rotational shaft 38 via the decelerator 34 during regenerative control, the motor MG2 functions as a power generator. The regenerative braking is not limited to a case where the driver executes a braking operation to decelerate the vehicle, and also includes cases where the driver releases pressing of the acceleration pedal to stop acceleration of the vehicle and where the vehicle is running down a slope by the action of gravity.

The motors MG1 and MG are electrically connected to corresponding inverters 44 and 46, respectively, and the inverters 44 and 46 are electrically connected to a battery 50 which functions as a power supply device, via a DC/DC converter (hereinafter simply referred to as "converter") 48. For the battery 50, a secondary battery such as a lithium ion battery is preferably used. Alternatively, in place of the battery, a capacitor which can be charged without a chemical reaction or a fuel cell which generates power using hydrogen as fuel may be used as the power supply device.

When the motors MG1 and MG2 function as a motor, a direct current voltage Vb which is a battery voltage is supplied to the converter 48 from the battery 50 through a smoothing capacitor 52. The converter 48 has a function to boost the input voltage Vb to a predetermined value Vc and output the boosted voltage. The converter 48 generally comprises a reactor, two switching elements for electric power (such as, for example, IGBT), and two diodes connected in a parallel head-to-tail manner to these switching elements. However, the structure of the converter is not limited to such a structure, and a convertor of any structure having a voltage boosting and reducing function of a direct current voltage may be used.

The direct current voltage Vc which is output from the converter 48 is input to the inverters 44 and 46 through an smoothing capacitor 54. The inverters 44 and 46 convert the input direct current voltage Vc into a three-phase alternate current voltage, and apply the converted voltage to the motors MG1 and MG2, so that the motors MG1 and MG2 are rotationally driven as motors. As described, the converter output voltage Vc is the inverter input voltage, and will hereinafter also be called a system voltage VH.

Each of the inverters 44 and 46 comprises a U-phase arm, a V-phase arm, and a W-phase arm, each of which comprises two switching elements for electric power (for example, IGBT), in which diodes are connected in a parallel head-to-tail manner, connected in series. Intermediate points of the phase arms of the U-phase, V-phase, and W-phase are connected to the phase coils of the motors MG1 and MG2. However, the structure of the inverter is not limited to that described above, and any structure having a direct current/alternate current conversion function may be used.

Because the motor MG1 is connected to the engine 12 via the mechanical power distributing and integrating mechanism 14, the motor MG1 may be driven as the motor and used as a cell motor for start of the engine, or may alternatively be driven as motor and subjected to torque control, to be used as a gearbox for changing the rotational speed Ne of the engine 12.

When the motors MG1 and MG2 function as power generators, on the other hand, a three-phase alternate current voltage which is output from the motors MG1 and MG2 is converted to direct current by the inverters 44 and 46, the voltage is reduced by the converter 48, and the battery 50 is charged. Because the inverters 44 and 46 share the power lines 56 and 58 connected to the converter 48, it is also possible to supply the power generated by one of the motors MG1 and MG2 to the other motor without passing through the converter 48, to rotationally drive the other motor.

The inverters 44 and 46 are electrically connected to an ECU for a motor (hereinafter also referred to as "motor ECU") 60, and the operations of the inverters 44 and 46 are controlled based on an ON/OFF control signal of the switching element for power, transmitted from the motor ECU 60. In addition, the motors MG1 and MG2 comprise rotational angle sensors 31 and 37 which detect rotational angles of rotors 29 and 36, respectively. The rotational angle sensors 31 and 37 are preferably formed with, for example, a resolver or the like. The detected values of the rotational angle sensors 31 and 37 are input to the motor ECU 60 and used for calculation or the like of the rotational speeds Nm1 and NM2 of the motors.

The motor ECU 60 controls the converter 48 and inverters 44 and 46 so that a mechanical power demanded based on a torque instruction Tr* which is input from a hybrid ECU 66 to be described below is output from the motor MG1 and/or MG2. In addition, when the motor ECU 60 receives a regeneration instruction from the hybrid ECU 66, the motor ECU 60 controls the converter 48 and the inverter 46 to charge the generated power which is output from the motor MG2 to the battery 50.

The battery 50 comprises an SOC sensor 62 for detecting a state of charge or remaining capacity (State Of Charge or SOC). The SOC sensor 62 may be formed with a current sensor which detects a charge/discharge current of the battery 50. A value detected by the SOC sensor 62 is input to an ECU for battery (hereinafter also referred to as "battery ECU") 64. In addition, a battery voltage Vb detected by a voltage sensor and a battery temperature detected by a temperature sensor (not shown) or the like are also input to the battery ECU 64. The battery ECU 64 monitors and controls the battery remaining capacity SOC to be maintained at an appropriate range based on an integrated value of the charge/discharge current detected by the SOC sensor 62, and outputs a charge limiting signal or a discharge limiting signal to the ECU for hybrid (hereinafter also referred to as "hybrid ECU") 66 according to the remaining battery capacity SOC.

The hybrid ECU 66 is electrically connected to the engine ECU 16, the motor ECU 60, and the battery ECU 64, and has a function to integrally control the operations of the engine 12 and the motors MG1 and MG2, and to manage the battery 50. The hybrid ECU 66 may be formed preferably with a microcomputer comprising a CPU which executes various programs for vehicle control, a ROM which stores a control program, a control map, etc. in advance, and a RAM to and from which various detected values can be stored and read at any time, etc. In the map stored in the ROM, an engine intermittent operation control program and a program to prohibit the engine from starting for a heater are stored in advance.

The hybrid ECU 66 transmits an engine control signal to the engine ECU 16 as necessary, and receives data related to the engine operation state (such as, for example, the rotational speed Ne of the engine) from the engine ECU 16 as necessary. In addition, the hybrid ECU 66 transmits the demand torque instruction Tr* to the motor ECU 60 as necessary, and receives data (such as, for example, rotational speeds of the motors Nm1 and Nm2, motor current, etc.) related to the motor operation state as necessary. Moreover, the hybrid ECU 66 receives from the battery ECU 64 data necessary for managing the battery such as the remaining battery capacity SOC, a battery voltage, a battery temperature, the charge/discharge limiting signals, etc.

A vehicle velocity sensor 68 and an acceleration opening sensor 70 are electrically connected to the hybrid ECU 66 and a vehicle velocity Sv which is the running velocity of the hybrid vehicle 10 and acceleration opening information Ac corresponding to an amount of pressing of the acceleration pedal (not shown) are input, respectively.

In addition, a display lamp (corresponding to display part) 71 which is placed at a location which can be easily viewed by the driver is electrically connected to the hybrid ECU 66. The display lamp 71 is switched ON and displayed based on a signal from the engine ECU 16 indicating that an abnormality judgment of the variable valve timing mechanism of the engine 12 is determined, and is provided for notifying the driver or a repair person of the abnormality or failure of the variable valve timing mechanism. The display unit for notifying the driver or the like of the abnormality of the variable valve timing mechanism is not limited to a display lamp, and may be, for example, a display unit of other display forms such as a display of a navigation system. Alternatively, the driver or the like may be notified of the abnormality of the variable valve timing mechanism using an automated voice along with a visual notification using light and text.

Figure 2:
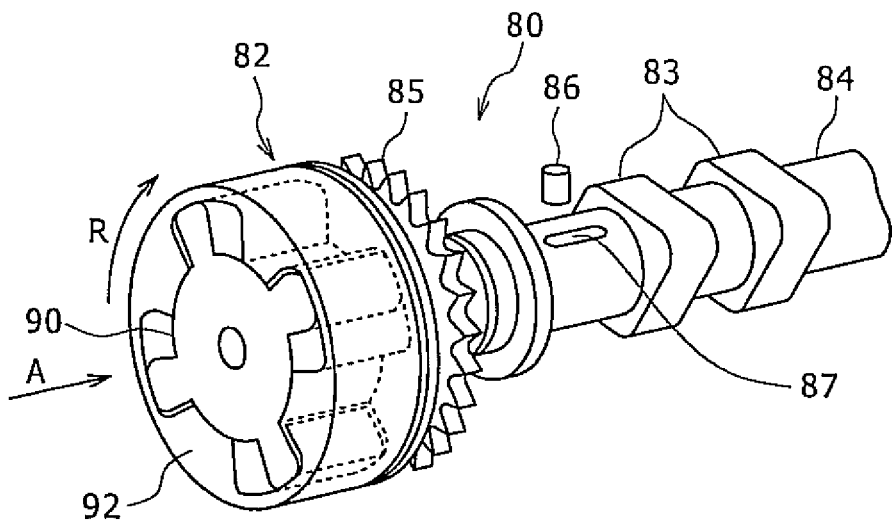
FIG. 2 is a perspective view showing a controller of a variable valve timing mechanism.
Figure 3:
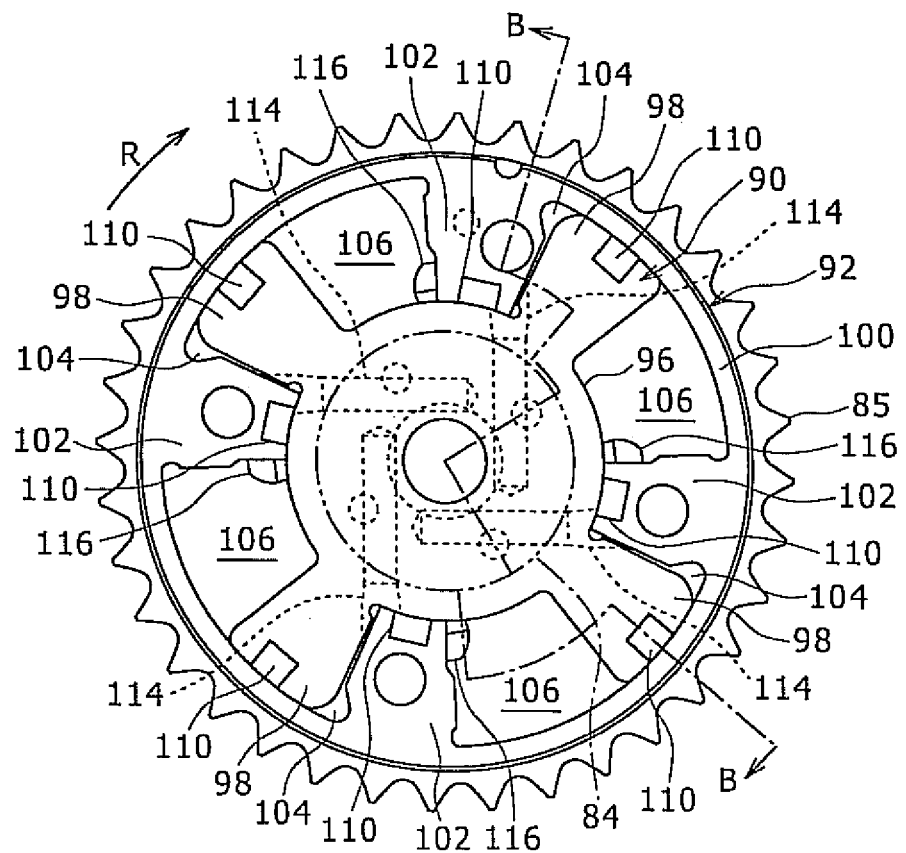
FIG. 3 is a front view of the controller of FIG. 2 viewed from a direction of an arrow A.
Figure 4:
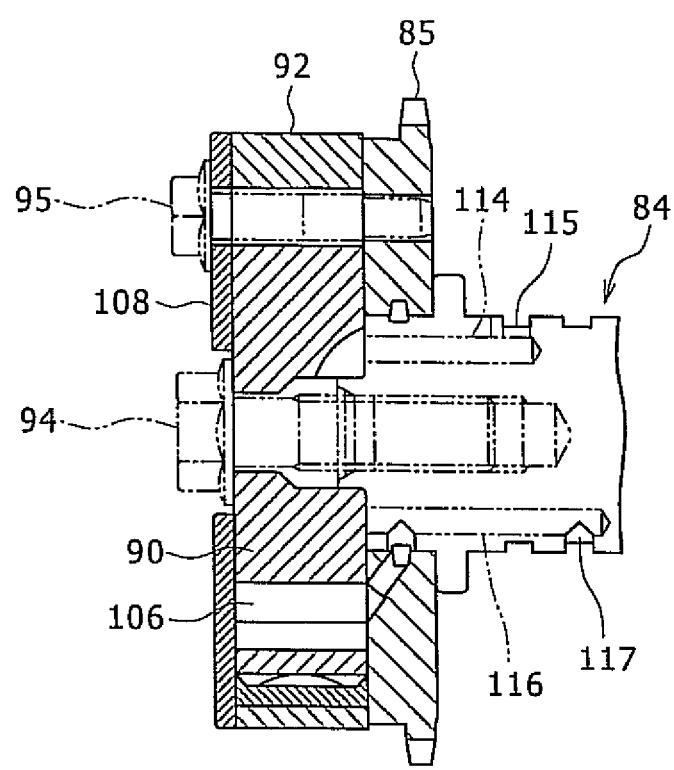
FIG. 4 is a cross sectional diagram along a B-B line of the controller of FIG. 3.

Next, primary portions of a variable valve timing mechanism 80 provided in the engine 12 will be described with reference to FIGS. 2 through 4. FIG. 2 is a perspective view showing a controller 82 of the variable valve timing mechanism 80, FIG. 3 is a front view of the controller 82 viewed from a direction of arrow A, and FIG. 4 is a cross sectional diagram along a B-B line of the controller 82 shown in FIG. 3.

As shown in FIG. 2, the controller 82 is connected along with a sprocket 85 to one end of a cam shaft 84 to which a cam 83 for opening and closing a suction valve (not shown) is fixed. The sprocket 85 is connected, along with a sprocket of a cam shaft for an exhaust valve provided in parallel to the cam shaft 84, to a sprocket fixed on the crankshaft of the engine 12, via an endless chain. With this structure, the cam shaft 84 is configured to rotate in synchronization with the crankshaft 13 when the engine 12 is operated.

In addition, a cam angle sensor 86 is provided opposing an outer peripheral surface of the camshaft 84. The cam angle sensor 86 detects one or a plurality of detection target sections 87 (only one of which is shown in FIG. 2) formed on a surface of the cam shaft 84, to detect a rotational angle θcam of the cam shaft 84. The value detected by the cam angle sensor 86 is input to the engine ECU 16.

In the present embodiment, a configuration is described in which the controller 82 which is apart of the variable valve timing mechanism 80 is provided on the cam shaft 84 for a suction valve, but the present invention is not limited to such a configuration, and a similar controller may be provided on at least one of the cam shafts for the suction valve and an exhaust valve.

The controller 82 comprises a rotor 90, and a housing 92 which stores the rotor 90 inside. As shown in FIG. 4, the rotor 90 is fixed on an end of the cam shaft 84 with a bolt 94, and rotates with the cam shaft 84. The housing 92 which stores the rotor 90 in a rotatable state, on the other hand, is fixed to a side surface of the sprocket 85 by a plurality of bolts 95, and rotates with the sprocket 85. With this structure, the rotational driving force which is input via the chain to the sprocket 85 is transmitted from the housing 92 to the rotor 90, and rotates the cam shaft 84.

As shown in FIG. 3, the rotor 90 comprises a center portion 96 having an approximately circular cylinder shape and a plurality (in the present embodiment, four) of vane portions 98 which protrude from an outer peripheral surface of the center portion 96 to the outside in a radial direction and which are uniformly provided with respect to the circumferential direction. The housing 92, on the other hand, comprises an outer peripheral portion 100 having an approximately circular tube shape, and a plurality (in the present embodiment, four) of partition wall portions 102 which protrude from an inner peripheral surface of the outer peripheral portion 100 toward the inside in the radial direction and which are uniformly provided with respect to the circumferential direction.

An outer peripheral end surface of the vane portion 98 of the rotor 90 and an inner peripheral wall surface of the outer peripheral portion 100 of the housing 92 are in contact with each other in a slidable manner. In addition, an inner peripheral end surface of the partition wall portion 102 of the housing 92 and an outer peripheral wall surface of the center portion 96 of the rotor 90 are in contact with each other in a slidable manner. With the rotor 90 and the housing 92 placed in this manner, with respect to the rotation direction of the cam shaft 84 and the sprocket 85 shown with an arrow R, an advance angle chamber 104 is formed between a downstream-side side surface of the vane portion 98 and an upstream-side side surface of the partition wall portion 102, and a lag angle chamber 106 is formed between an upstream-side side surface of the vane portion 98 and a downstream-side side surface of the partition wall portion 102.

In the present embodiment, four advance angle chambers 104 and four lag angle chambers 106 are closed in an airtight state by a cover member 108 fixed on the housing 92 by the bolt 95. In addition, in order to secure airtightness between the advance angle chamber 104 and the lag angle chamber 106 which are adjacent to each other in the circumferential direction, a sealing member 110 is provided on the outer peripheral end surface of the vane portion 98 of the rotor 90 and the inner peripheral end surface of the partition wall portion 102 of the housing 92.

Through each advance angle chamber 104, an advance angle operation oil passage 114 formed in an end of the cam shaft 84 is opened and connected. With this structure, the operation oil which enters or exits the advance angle chamber 104 through the advance angle operation oil passage 114 from and to an advance angle operation oil supply and exhaust port 115 formed on an outer peripheral surface of an end of the cam shaft 84 is supplied to or exhausted from the advance angle chamber 104 with a uniform pressure.

Similarly, through each lag angle chamber 106, a lag angle operation oil passage 116 formed in an end of the cam shaft 84 is opened and connected. With this structure, the operation oil which enters or exits the lag angle chamber 106 through the lag angle operation oil passage 116 from or to a lag angle operation oil supply and exhaust port 117 formed on an outer peripheral surface of an end of the cam shaft is supplied to or exhausted from the lag angle chamber 106 with a uniform pressure.

Figure 5:
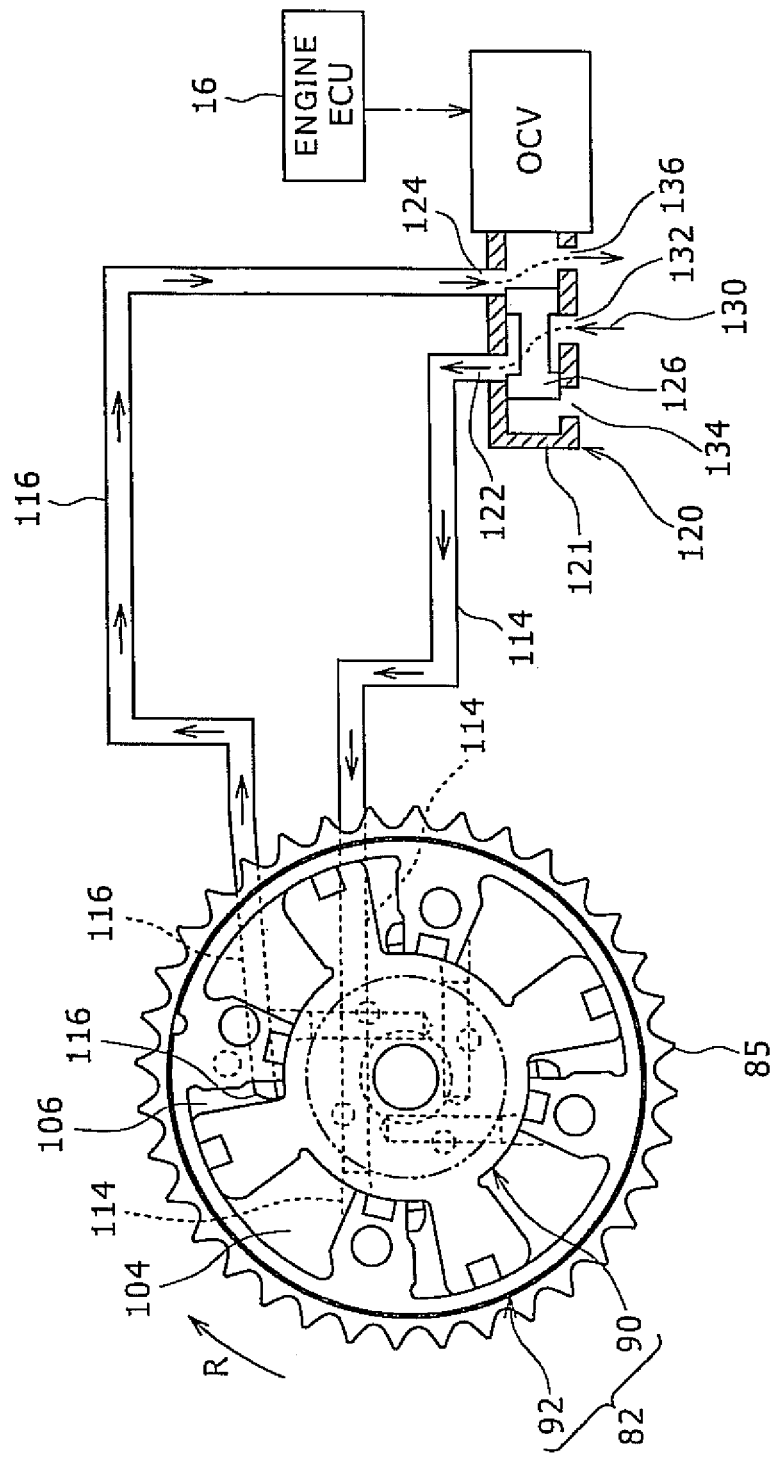
FIG. 5 is a diagram for explaining an operation to advance a phase angle of a cam shaft in a variable valve timing mechanism.

Next, hydraulic control of the controller 82 including the advance angle chamber 104 and the lag angle chamber 106 as described above will be described with reference to FIGS. 5 through 7. FIG. 5 is a diagram for explaining an operation to advance the phase angle of the cam shaft 84 (that is, cam 83; similarly in the following description) in the variable valve timing mechanism 80, FIG. 6 is a diagram for explaining an operation to delay the phase angle of the cam shaft 84 in the variable valve timing mechanism 80, and FIG. 7 is a diagram for explaining an operation to maintain the phase angle of the cam shaft 84 in the variable valve timing mechanism 80.

With reference to FIG. 5, the advance angle chamber 104 and the lag angle chamber 106 of the controller 82 are respectively connected to openings 122 and 124 formed in a tubular valve housing 121 of an oil control valve (OCV) via the advance angle operation oil passage 114 and the lag angle operation oil passage 116. In the valve housing 121 of the oil control valve 120, a spool valve element 126 is stored in a movable manner, and a position of the spool valve element 126 is determined by, for example, an electromagnetic actuator. The electromagnetic actuator is completely magnetized, intermediately magnetized, or demagnetized according to a signal from the engine ECU 16. In addition, in the valve housing 121, an operation oil supply port 132 through which the operation oil is supplied with a predetermined pressure from an operation oil reservoir (not shown) as shown by an arrow 130, and operation oil exhaust ports 134 and 136 through which the operation oil is exhausted from the oil control valve 120 to the operation oil reservoir, are formed.

When the electromagnetic actuator is demagnetized, the spool valve element 126 is positioned at a position shown in FIG. 5. In this configuration, the spool valve element 126 connects, in the valve housing 121, the operation oil supply port 132 and the opening 122 to which the advance angle operation oil passage 114 is connected, and connects the operation oil exhaust port 136 and the opening 124 to which the lag angle operation oil passage 116 is connected. With this configuration, the operation oil enters through the advance angle operation oil passage 114 to expand the advance angle chamber 104, and exits through the lag angle operation oil passage 116 to contract the lag angle chamber 106. As a result, in the controller 82, the angular position of the rotor 90 with respect to the housing 92 is rotated in a rotational direction (direction of arrow R), and the cam shaft 84 is advanced.

Figure 6:
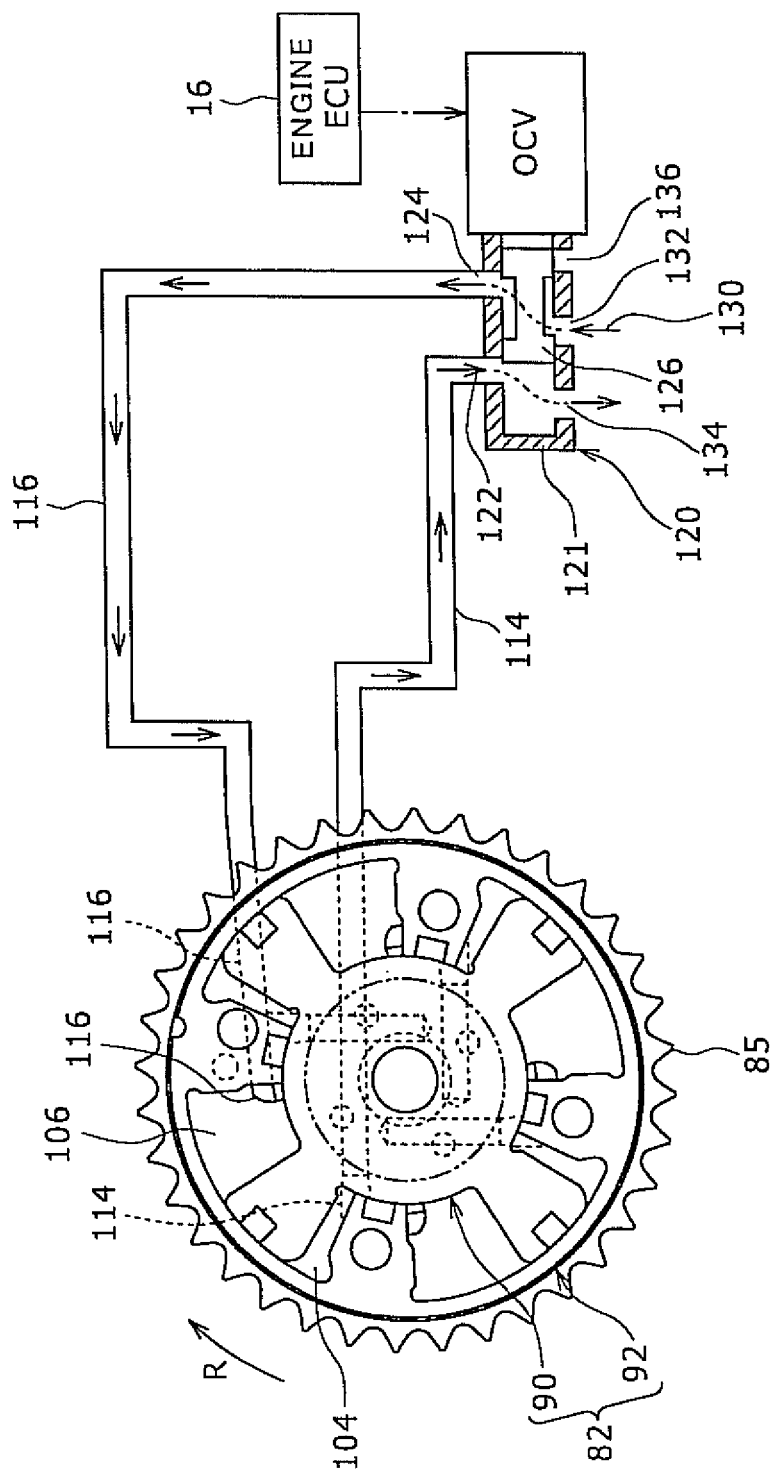
FIG. 6 is a diagram for explaining an operation to delay the phase angle of the cam shaft in the variable valve timing mechanism.
Figure 7:
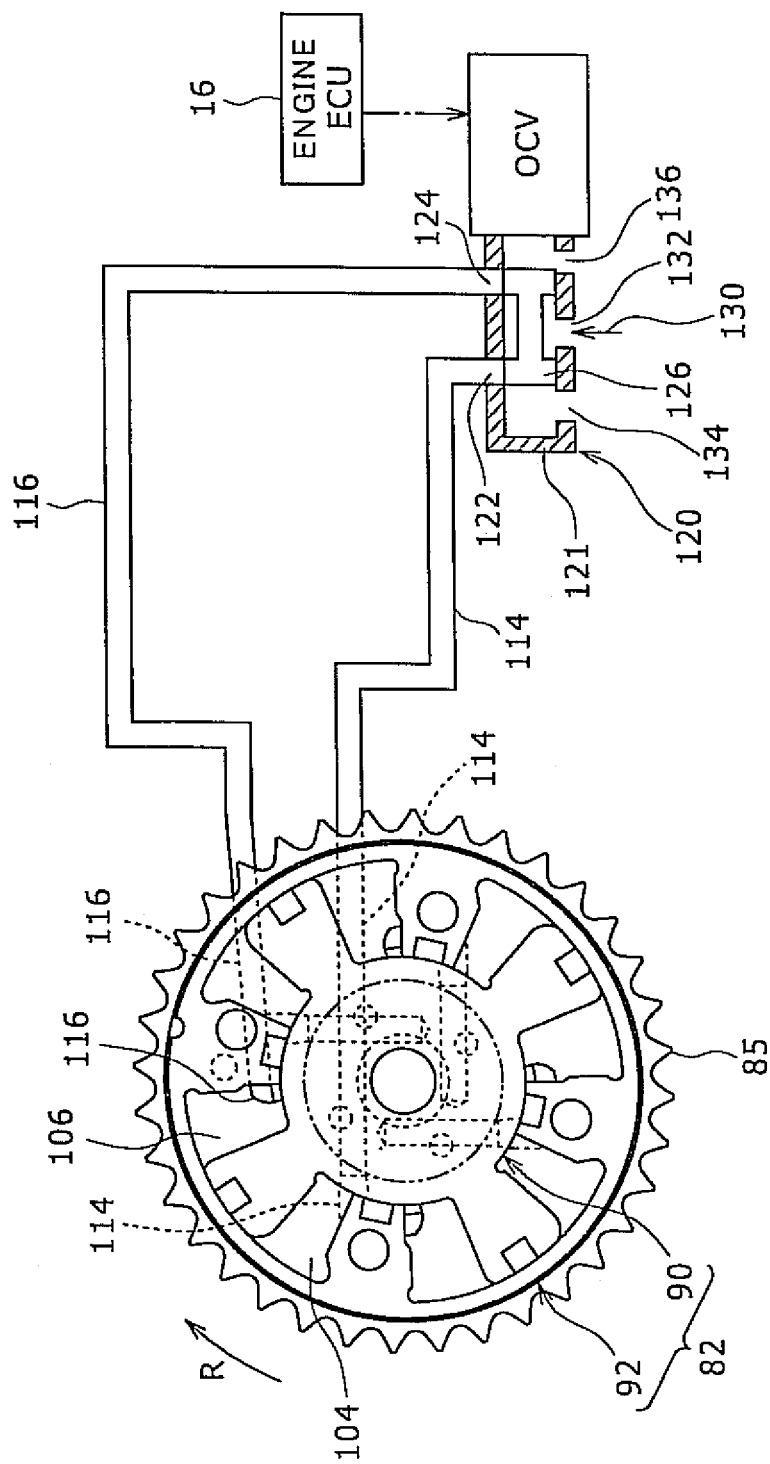
FIG. 7 is a diagram for explaining an operation to maintain the phase angle of the cam shaft in the variable valve timing mechanism.

With reference to FIG. 6, when the electromagnetic actuator is completely magnetized, the spool valve element 126 connects, in the valve housing 121, the operation oil supply port 132 and the opening 124 to which the lag angle operation oil passage 116 is connected, and connects the operation angle exhaust port 134 and the opening 122 to which the advance angle operation oil passage 114 is connected. With this configuration, the operation oil enters through the lag angle operation oil passage 116 to expand the lag angle chamber 106, and exits through the advance angle operation oil passage 114 to contract the advance angle chamber 104. As a result, in the controller 82, the angular position of the rotor 90 with respect to the housing 92 is rotated in a direction opposite to the rotation direction (direction of arrow R), and the cam shaft 84 is delayed.

With reference to FIG. 7, on the other hand, when the electromagnetic actuator is intermediately magnetized, the spool valve element 126 is positioned, in the valve housing 121, at a position to close both of the two openings 122 and 124. With this configuration, the entrance and exiting of the operation oil to and from both the advance angle chamber 104 and the lag angle chamber 106 are stopped, and the angular position of the rotor 90 with respect to the housing 92 is maintained. As a result, the advance angle or lag angle of the cam shaft 84 is constantly maintained at a target phase angle.

Figure 8:
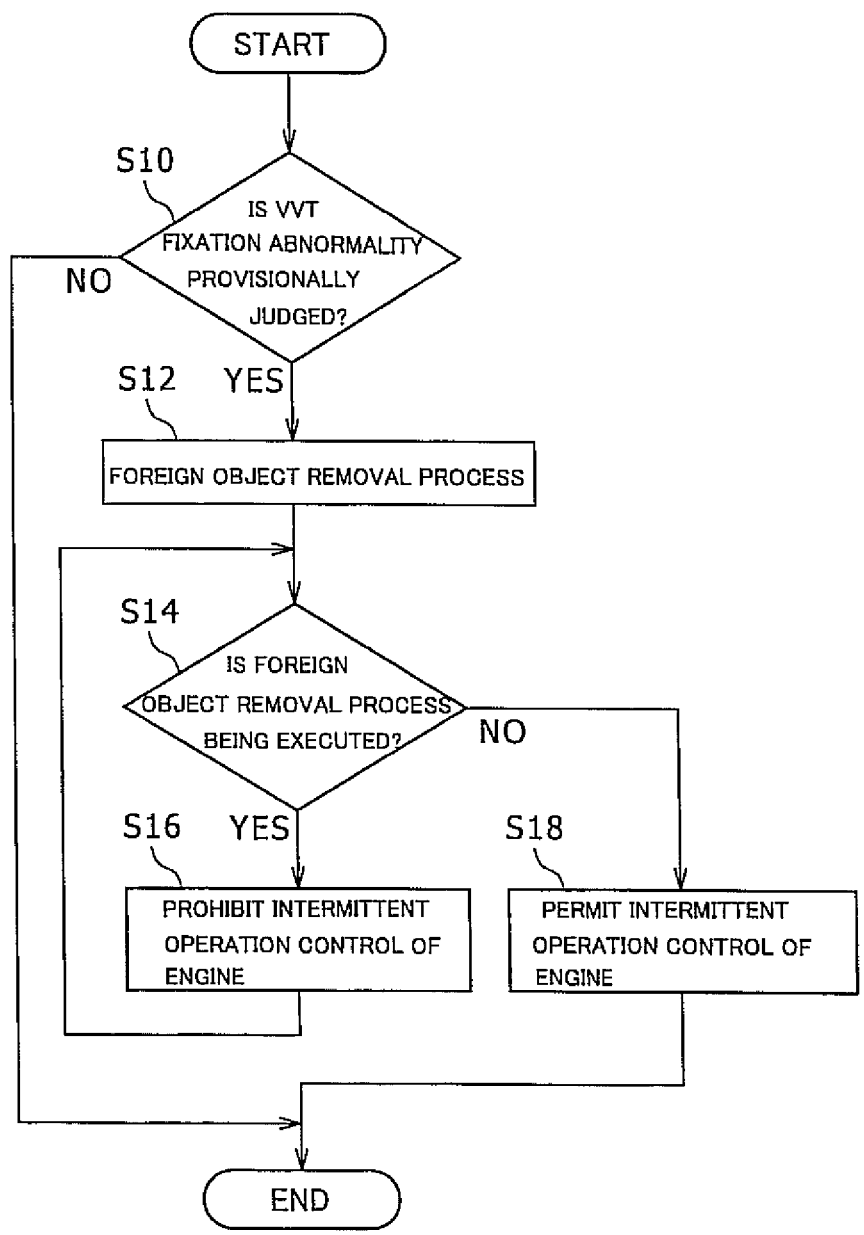
FIG. 8 is a flowchart showing processing steps of prohibiting the engine intermittent operation control during a foreign object removal process executed in the engine control device according to the preferred embodiment of the present invention.

Next, with reference to FIG. 8, control executed by the engine ECU 16 will be described. FIG. 8 is a flowchart showing processing steps for prohibiting intermittent operation control of the engine 12 during the foreign object removal process executed by the controller 82 of the variable valve timing mechanism 80. The process shown in FIG. 8 is periodically executed during an engine operation every predetermined time (for example, every few msecs).

The engine ECU 16 continuously monitors the crank angle $\theta cr$ detected by the crank angle sensor 11 (refer to FIG. 1), and the cam angle $\theta cam$ detected by the cam angle sensor 86 (refer to FIG. 2), during the operation of the engine 12. The cam angle $\theta cam$ is set to a target phase angle $\theta cam^*$ by hydraulic control of the oil control valve 120 described above, based on an operation state of the engine, for example, the rotational speed Ne of the engine. For the target phase angle $\theta cam^*$, a value which is stored in the ROM included in the engine ECU 16 in advance in the form of a table or a map or the like is read and used.

When the process of FIG. 8 is started, first, in step S10, it is provisionally judged whether or not a fixation abnormality of the variable valve timing mechanism 80 has occurred. The fixation abnormality of the variable valve timing mechanism 80 in many cases is caused by a foreign object such as metal powder included in the operation oil being clogged between movable portions of the variable valve timing mechanism 80, for example, between the spool valve element 126 of the oil control valve 120 and the valve housing 121 or between the rotor 90 of the controller 82 and the housing 92, resulting in an operation deficiency.

In the step S10 described above, when a state where a difference between an actual cam angle $\theta cam$ detected by the cam angle sensor 86 and the target phase angle $\theta cam^*$ is greater than a predetermined angle range (for example, ±5 degrees) is continued for a predetermined period (for example, 10 seconds), it is provisionally judged that there is a fixation abnormality in the variable valve timing mechanism 80. When this is not the case, on the other hand, it is judged that there is no fixation abnormality, and the end process is executed.

When it is provisionally judged in step S10 that there is a fixation abnormality in the variable valve timing mechanism 80, the process proceeds to step S12, and a foreign object removal process (abnormality recovery process) is executed. In the foreign object removal process, the position of the spool valve element 126 of the oil control valve 120 moves alternately between the position shown in FIG. 5 and the position shown in FIG. 6 in a short time period. With this process, the rotor 90 alternately rotates to the advance angle side or the lag angle side with respect to the housing 92, and as a result, the foreign object causing the operation deficiency may be removed.

In the above-described foreign object removal process, it is also possible to supply operation oil 130 at a hydraulic pressure higher than that during the normal operation. In order to do so, the control to increase the rotational speed of the oil pump which supplies the operation oil 130 to the oil control valve 120 may be executed. With this process, the effect of the foreign object removal process can be further improved.

In subsequent step S14, it is judged whether or not the foreign object removal process is being executed. In this step, if the foreign object removal process is being executed, in the next step S16, the intermittent operation control of the engine 12 is prohibited. With this process, it is possible to prevent stopping of the engine 12 during the foreign object removal process which is programmed to be continuously executed for only a predetermined period (for example, 9 seconds), and to reliably complete the foreign object removal process. As a result, it is possible to inhibit failure judgment of the variable valve timing mechanism 80 in a case where the variable valve timing mechanism 80 can be recovered to the normal operation with the foreign object being removed by the foreign object removal process.

With the steps S14 and S16 described above, the intermittent operation control of the engine is prohibited during the predetermined period in which the foreign object removal process is executed, and when the foreign object removal process is completed (NO in step S14), the intermittent operation control of the engine 12 is permitted in step S18, and the engine returns to the normal engine control state.

After the foreign object removal process is executed for the predetermined time period as described above, the hydraulic control by the oil control valve 120 is executed so that the cam shaft 84 is set at the target phase angle θcam*. If the angle difference between the actual cam angle θcam detected by the cam angle sensor 86 and the target phase angle θcam* is within a predetermined angle range (for example, ±5 degrees), it is judged that the fixation abnormality of the variable valve timing mechanism 80 is resolved and the engine has returned to the normal operation. When, on the other hand, the angle difference is out of the predetermined angle range, the fixation abnormality of the variable valve timing mechanism 80 is determined, and the determination signal is transmitted from the engine ECU 16 to the hybrid ECU 66. The hybrid ECU 66 receives this determination signal, and causes the display lamp to emit light, to notify the driver that an abnormality has occurred in the variable valve timing mechanism 80.

In the above-described embodiment, a configuration is described in which the engine ECU 16 executes the process to prohibit the intermittent operation control of the engine during the foreign object removal process, but alternatively, the hybrid ECU 66 may executes a similar process in place of the engine ECU 16.

Although the present invention has been fully described by way of examples with reference to the accompanying drawings, it is to be noted that various changes and modifications will be apparent to those skilled in the art. Therefore, unless such changes and modifications depart from the spirit and the scope of the present invention, they should be construed as being included therein.

What is claimed is:

1. An engine control device which can execute intermittent operation control of an engine having a variable valve timing mechanism, the engine control device comprising:
    an abnormality recovery process executing part which executes an abnormality recovery process for the variable valve timing mechanism while continuing an engine operation when there is an abnormality in the variable valve timing mechanism during the engine operation;
    an intermittent operation control prohibiting part which prohibits the intermittent operation control of the engine during execution of the abnormality recovery process of the variable valve timing mechanism; and
    an intermittent operation control allowing part which allows the intermittent operation control of the engine when the abnormality recovery process of the variable valve timing mechanism is not being executed.

2. The engine control device according to claim 1, wherein it is judged that there is the abnormality in the variable valve timing mechanism when a difference between an actual phase angle of a cam shaft of the variable valve timing mechanism detected by a cam angle sensor and a target phase angle is greater than a predetermined angle.

3. The engine control device according to claim 1, wherein the variable valve timing mechanism comprises a rotor which is connected to an end of a cam shaft to which a cam which opens and closes at least one of a suction valve and an exhaust valve of the engine is fixed, a housing which stores inside the rotor in a rotatable state by hydraulic control and which rotates with the rotor in synchronization with a crankshaft of the engine, and a control valve which controls supply and exhaust of operation oil in the housing to rotate the angular position of the rotor with respect to the housing to an advance angle side or a lag angle side, and
    the abnormality recovery process is an operation to rotate the rotor so that the angular position of the rotor with respect to the housing alternately changes in a predetermined time interval to the advance angle side or the lag angle side.

4. The engine control device according to claim 3, wherein during execution of the abnormality recovery process, a hydraulic pressure of the operation oil supplied to the control valve is set higher than that during a normal operation.

5. The engine control device according to claim 1, wherein when the abnormality of the variable valve timing mechanism is not resolved even after the abnormality recovery process is continued for a predetermined time period, the abnormality of the variable valve timing mechanism is displayed on a display part.

6. The engine control device according to claim 1, which is equipped in a hybrid vehicle which is equipped with a motor which is driven by receiving supply of electric power from a battery as a running power source in addition to the engine which is a running power source.

7. A vehicle comprising the engine control device according to claim 1.

* * * * *